(12) United States Patent
Brown et al.

(10) Patent No.: US 9,196,027 B2
(45) Date of Patent: Nov. 24, 2015

(54) AUTOMATIC FOCUS STACKING OF CAPTURED IMAGES

(71) Applicant: International Business Machines Corporation, Armonk, NY (US)

(72) Inventors: Douglas S. Brown, Charlotte, NC (US); John F. Kelley, Clarkesville, GA (US); Kristin S. Moore, Atlanta, GA (US); Todd P. Seager, Orem, UT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/231,281

(22) Filed: Mar. 31, 2014

(65) Prior Publication Data

US 2015/0279012 A1  Oct. 1, 2015

(51) Int. Cl.
*G06K 9/00* (2006.01)
*G06T 5/50* (2006.01)
(52) U.S. Cl.
CPC ......... *G06T 5/50* (2013.01); *G06T 2207/20221* (2013.01)
(58) Field of Classification Search
USPC .................................................. 382/154, 284
See application file for complete search history.

(56) References Cited

U.S. PATENT DOCUMENTS

| 4,522,475 | A | 6/1985 | Ganson |
|---|---|---|---|
| 5,307,170 | A | 4/1994 | Itsumi et al. |
| 6,320,979 | B1 | 11/2001 | Melen |
| 6,624,402 | B2 | 9/2003 | Kaneko et al. |
| 6,801,717 | B1 | 10/2004 | Hofer |
| 7,006,709 | B2 | 2/2006 | Kang et al. |
| 7,249,170 | B2 | 7/2007 | Tindal et al. |
| 7,398,434 | B2 | 7/2008 | Auvenshine et al. |
| 7,551,770 | B2 | 6/2009 | Harman |
| 7,676,559 | B2 | 3/2010 | Cuervo |
| 7,689,685 | B2 | 3/2010 | Ahmed et al. |
| 7,706,632 | B2 | 4/2010 | Gouch |
| 7,711,259 | B2 | 5/2010 | Daley |
| 7,747,067 | B2 | 6/2010 | Popescu et al. |
| 7,757,268 | B2 | 7/2010 | Gupta et al. |

(Continued)

FOREIGN PATENT DOCUMENTS

| CN | 1926851 A | 3/2007 |
|---|---|---|
| CN | 102422630 A | 4/2012 |

(Continued)

OTHER PUBLICATIONS

Bargh, Peter, "Focus Stacking—a macro photography technique", You Tube video, retrieved on Dec. 10, 2013 from website: <http://www.youtube.com/watch?v=fJEw4CcYU>.

(Continued)

*Primary Examiner* — Duy M Dang
(74) *Attorney, Agent, or Firm* — Edward J. Wixted, III

(57) ABSTRACT

In a method for generating a focused image of subject matter, a first image is received, wherein the first image includes subject matter and a first set of image data. One or more processors generates a first depth map for the first image. One or more processors determines at least a second image to be captured. The second image is received, wherein the second image includes the subject matter of the first image and at least a second portion of the subject matter is in focus. One or more processors generate a composite image comprising at least the first portion of the first image and the second portion of the second image.

20 Claims, 11 Drawing Sheets

(56) References Cited

U.S. PATENT DOCUMENTS

| | | |
|---|---|---|
| 7,962,445 B2 | 6/2011 | Auvenshine et al. |
| 8,082,337 B1 | 12/2011 | Davis et al. |
| 8,254,630 B2 | 8/2012 | Abe |
| 8,406,548 B2 | 3/2013 | Ali et al. |
| 8,432,434 B2 | 4/2013 | Veeraraghavan et al. |
| 8,638,329 B2 | 1/2014 | Izumi |
| 8,983,176 B2 | 3/2015 | Kelley et al. |
| 2002/0041339 A1 | 4/2002 | Diepold |
| 2005/0050193 A1 | 3/2005 | Edwiges et al. |
| 2005/0157204 A1 | 7/2005 | Marks |
| 2006/0072851 A1 | 4/2006 | Kang et al. |
| 2006/0072852 A1 | 4/2006 | Kang et al. |
| 2007/0053675 A1 | 3/2007 | Pollard |
| 2007/0269119 A1 | 11/2007 | Hyerle et al. |
| 2008/0031327 A1 | 2/2008 | Wang et al. |
| 2008/0175576 A1 | 7/2008 | Hong et al. |
| 2008/0309770 A1 | 12/2008 | Florea et al. |
| 2010/0157127 A1 | 6/2010 | Takayanagi et al. |
| 2010/0182495 A1 | 7/2010 | Murata |
| 2011/0069884 A1 | 3/2011 | Zhang et al. |
| 2011/0280475 A1 | 11/2011 | Singhal et al. |
| 2011/0293137 A1 | 12/2011 | Gurman et al. |
| 2012/0007940 A1 | 1/2012 | Michrowski et al. |
| 2012/0007942 A1 | 1/2012 | Michrowski et al. |
| 2012/0069222 A1 | 3/2012 | Steinberg et al. |
| 2012/0098947 A1 | 4/2012 | Wilkes |
| 2012/0106937 A1 | 5/2012 | Molin et al. |
| 2012/0133639 A1 | 5/2012 | Kopf et al. |
| 2012/0169849 A1 | 7/2012 | Ferren |
| 2012/0200726 A1 | 8/2012 | Bugnariu |
| 2012/0242790 A1 | 9/2012 | Sandrew et al. |
| 2013/0033582 A1 | 2/2013 | Sun et al. |
| 2013/0094753 A1 | 4/2013 | Voss et al. |
| 2013/0101206 A1 | 4/2013 | Dedeoglu et al. |
| 2013/0113988 A1 | 5/2013 | Wajs |
| 2013/0127823 A1 | 5/2013 | Diverdi et al. |
| 2014/0185920 A1 | 7/2014 | Kelley et al. |

FOREIGN PATENT DOCUMENTS

| | | |
|---|---|---|
| CN | 102842110 A | 12/2012 |
| EP | 0751674 A2 | 1/1997 |
| JP | 10-206150 | 8/1998 |
| JP | 2007-128009 | 5/2007 |
| JP | 2010041299 A | 2/2010 |
| WO | 2009013682 A2 | 1/2009 |
| WO | 2010145499 A1 | 12/2010 |

OTHER PUBLICATIONS

Billiot et al., "3D Image Acquisition System Based on Shape from Focus Technique", Sensors 2013, ISSN 1424-8220, retrieved from website: <www.mdpi.com/journal/sensors>.

Cambridge in Colour, "Focus Stacking & Depth of Field", retrieved on Dec. 10, 2013 from website: <http://www.cambridgeincolour.com/tutorials/focus-stacking.htm>.

Earthbound Light, "Close-up: Focusing Rails", retrieved on Dec. 26, 2013 from website: <http://www.earthboundlight.com/phototips/closeup-focusing-rail.html>.

"Hyperfocal Distance Guide", Hyperfocal Distance; Printed: Oct. 23, 2012; Copyright: 2002 Don Fleming; <http://www.dofmaster.com/hyperfocal.html>.

Isidro, Raoul, "Nikon D5000 The Fun Guide", retrieved on Sep. 5, 2013 from website: <http://raoulisidro.com/page10.htm>.

Meunier et al., Radar image modeling: A 3D Spectral domain approach; 0-8194-2211-8/96, SPIE vol. 2823; pp. 149-159.

"pCam Film+Digital Calculator", Printed: Oct. 23, 2012; <http://www.davideubank.com/Good_Focus/pCAM_Film+Digital_Calculator.html>.

Spirit of Photography, "Focus Stacking Techniques for Extended Depth of Field", retrieved on Sep. 5, 2013 from website: <http://community.spiritofphotography.com/index.php?page=22>.

U.S. Appl. No. 13/732,577, entitled, "Depth of Field Visualization", filed Jan. 2, 2013.

U.S. Appl. No. 13/732,562, entitled, "Image Selection and Masking Using Imported Depth Information", filed Jan. 2, 2013.

Wesley, "The Niko D800/E Autofocus Saga Continues", Nikon Fanboy, Aug. 22, 2012, retrieved from website: <http://nikonfanboy.com/tag/asymetric-focus>.

Wikipedia, "Focus stacking", Wikipedia, the free enclyclopedia, last modified Nov. 9, 2013, retrieved from website: <http://en.wikipedia.org/wiki/Focis_stacking>.

"About Bayesian Belief Networks", bnet. builder, Last updated: Apr. 22, 2008, Copyright © 2004, Charles River Analytics, Inc., pp. 1-14, <https://www.cra.com/pdf/BNetBuilderBackground.pdf>.

"Guide to Image Sharpening", Cambridge in Colour, Printed on: Jun. 29, 2015, © 2015, Cambridge in Colour, pp. 1-11, <http://www.cambridgeincolour.com/tutorials/image-sharpening.htm>.

"Tutorials: Sharpness", Cambridge in Colour, Printed on: Jun. 29, 2015, © 2015, Cambridge in Colour, pp. 1-4, <http://www.cambridgeincolour/tutorials/sharpness.htm>.

Druchinin, Vitaly, "Anti Aliasing/Low Pass filter removal for sharper more detailed images", Life Pixel, Nov. 1, 2012, Printed on: Jun. 29, 2015, pp. 1-9, <http://www.lifepixel.com/blog/anti-aliasing-low-pass-filter-removal>.

Cutting, James E., "Representing motion in a static image: constraints and parallels in art, science, and popular culture", Perception, 2002, vol. 31, pp. 1165-1193.

Masuch et al., "Depicting Motion in Motionless Pictures", Speedlines, In: SIGGRAPH'99 Conference Abstracts and Applications, S. 277, ACM SIGGRAPH, 1999, 3 pages.

Ok et al., "The Design of Service Management System Based on Policy-based Network Management", Networking and Services, 2006. ICNS '06. International conference, Silicon Valley, CA, ©2006, IEEE, 6 pages, <http://ieeexplore.ieee.org/xpl/articleDetails.jsp?arnumber=1690530&queryText=The+Design+of+Service+Management+System+based+on+Policy-based+Network+Management&newsearch=true&searchField=Search_All>.

Bigelow, Ron, "Sharpening in Photoshop—Part II", Ron Bigelow, Retrieved on: Apr. 3, 2014, pp. 1-11, <http://www.ronbigelow.com/articles/sharpen2/sharpen2.htm>.

Bigelow, Ron, "Sharpening in Photoshop—Part V", Ron Bigelow, retrieved Dec. 13, 2013, pp. 1-23, <http://www.ronbigelow.com/articles/sharpen5/sharpen5.htm>.

Spitzer, Jim, "What is a Redshift", YouTube video, uploaded on Nov. 27, 2006, retrieved on Mar. 17, 2014, pp. 1-3, <http://www.youtube.com/watch?v=FhfnqboacV0>.

"Redshift", Wikipedia, the free encyclopedia, last modified on Mar. 12, 2014, retrieved on Mar. 17, 2014, pp. 1-11, <http://en.wikipedia.org/w/index.php?title=Redshift&printable=yes>.

U.S. Appl. No. 14/248,396, "Real-Time Sharpening of Raw Digital Images", Filed on: Apr. 9, 2014.

U.S. Appl. No. 14/231,097, "Displaying Relative Motion of Objects in an Image", Filed on Mar. 31, 2014.

U.S. Appl. No. 14/588,476, "Automated Iterative Image-Masking Based on Imported Depth Information", Filed on Jan. 2, 2015.

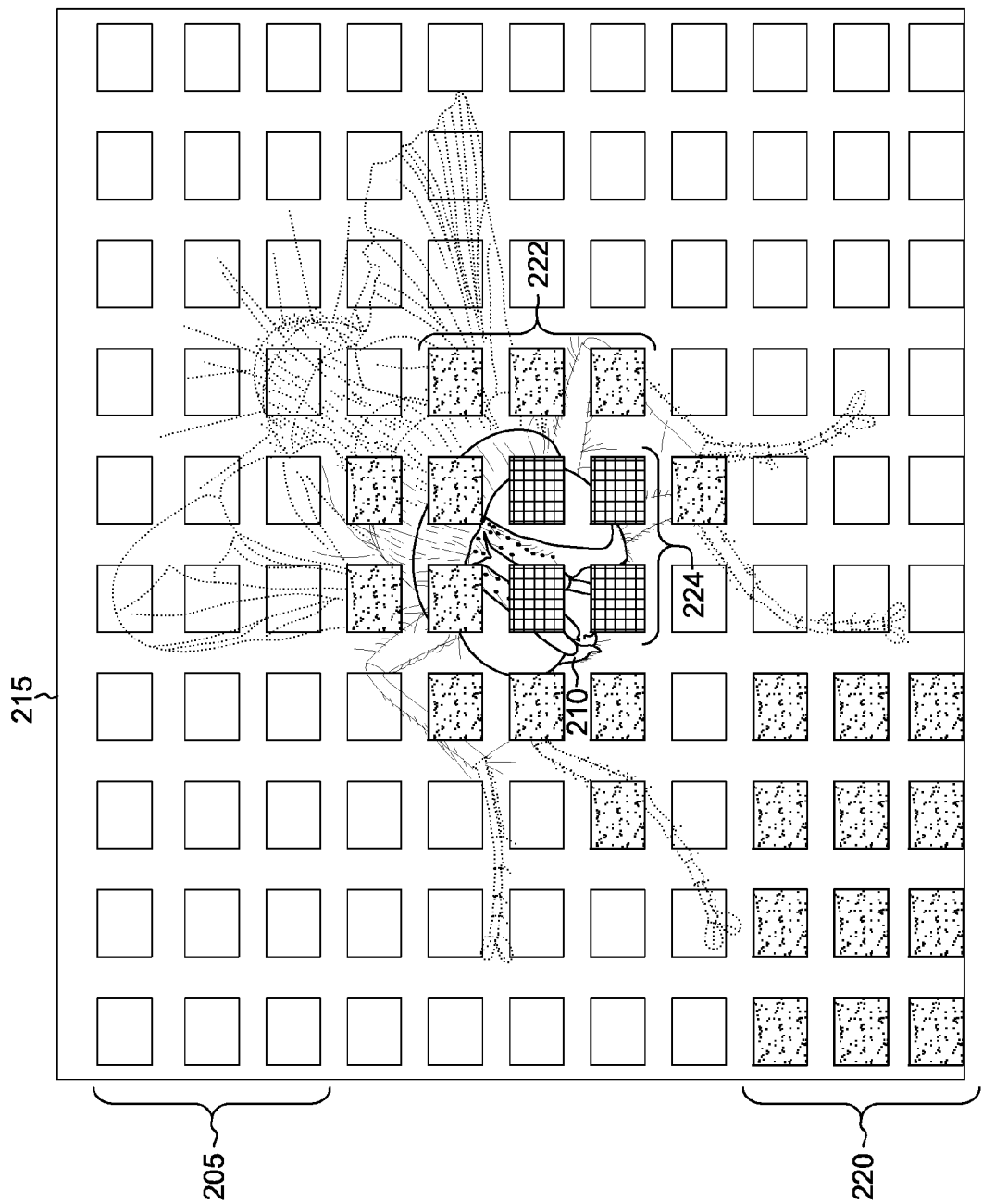

AUTOMATIC FOCUS STACKING OF CAPTURED IMAGES

FIELD OF THE INVENTION

The present invention relates generally to the field of photography, and more particularly to automatic focus stacking of a series of captured images.

BACKGROUND OF THE INVENTION

Under certain conditions, it is a challenge in the field of photography to capture images in which the entire subject matter of the image is sharply in focus. For example, in the field of endoscopy, images of human internal organs are captured and can contain pairs of regions which are at significantly different distances from the camera lens, exceeding the depth of focus of the image capturing device. As a result, in the captured images, at least one of the regions is out of focus.

Focus stacking is a powerful technique for extending the apparent depth of field of an image. Focus stacking combines multiple source images captured at different focus distances to create a resulting composite image with a greater depth of field than each of the individual source images comprising the composite image. No individual source image used to create the composite image will have the subject of the image entirely in focus. However, the individual source images may collectively contain the image data required to create a final composite image that includes all parts of the subject in focus. Using post-processing software, in-focus regions of each individual source image are automatically detected. The in-focus regions are blended together to create a final composite image.

SUMMARY

Aspects of embodiments of the present invention disclose a method, computer program product, and computer system for generating a focused image of subject matter. The method includes receiving a first image, wherein the first image includes subject matter and a first set of image data. The method further includes generating, by one or more processors, a first depth map for the first image using at least the first set of image data, wherein the first depth map indicates at least a first portion of the subject matter that is in focus. The method further includes determining, by one or more processors, at least a second image to be captured and one or more settings associated with the second image, based at least on the first set of image data. The method further includes causing, by one or more processors, the second image to be captured, according to the one or more settings associated with the second image. The method further includes receiving the second image, wherein the second image includes the subject matter of the first image and at least a second portion of the subject matter is in focus. The method further includes generating, by one or more processors, a composite image comprising at least the first portion of the first image and the second portion of the second image.

BRIEF DESCRIPTION OF THE SEVERAL VIEWS OF THE DRAWINGS

FIG. 2C is an exemplary view of the user interface for the first image as affected by a focus stacking program for automatically focusing subject matter of a captured image, in accordance with one embodiment of the present invention.

DETAILED DESCRIPTION

Focus stacking enables a user to blend in-focus regions of subject matter depicted in a series of images, taken at varying focus distances, to create a final composite image that includes the in-focus regions of multiple images in the series of images. Focus stacking can be a time consuming post-processing technique that requires the subject to be motionless while a series of images are captured. Traditionally, focus stacking requires the use of focus rails or incremental manual focus, making focus stacking a technically challenging process. Embodiments of the present invention automate focus stacking image capture and post-processing.

Figure 1:
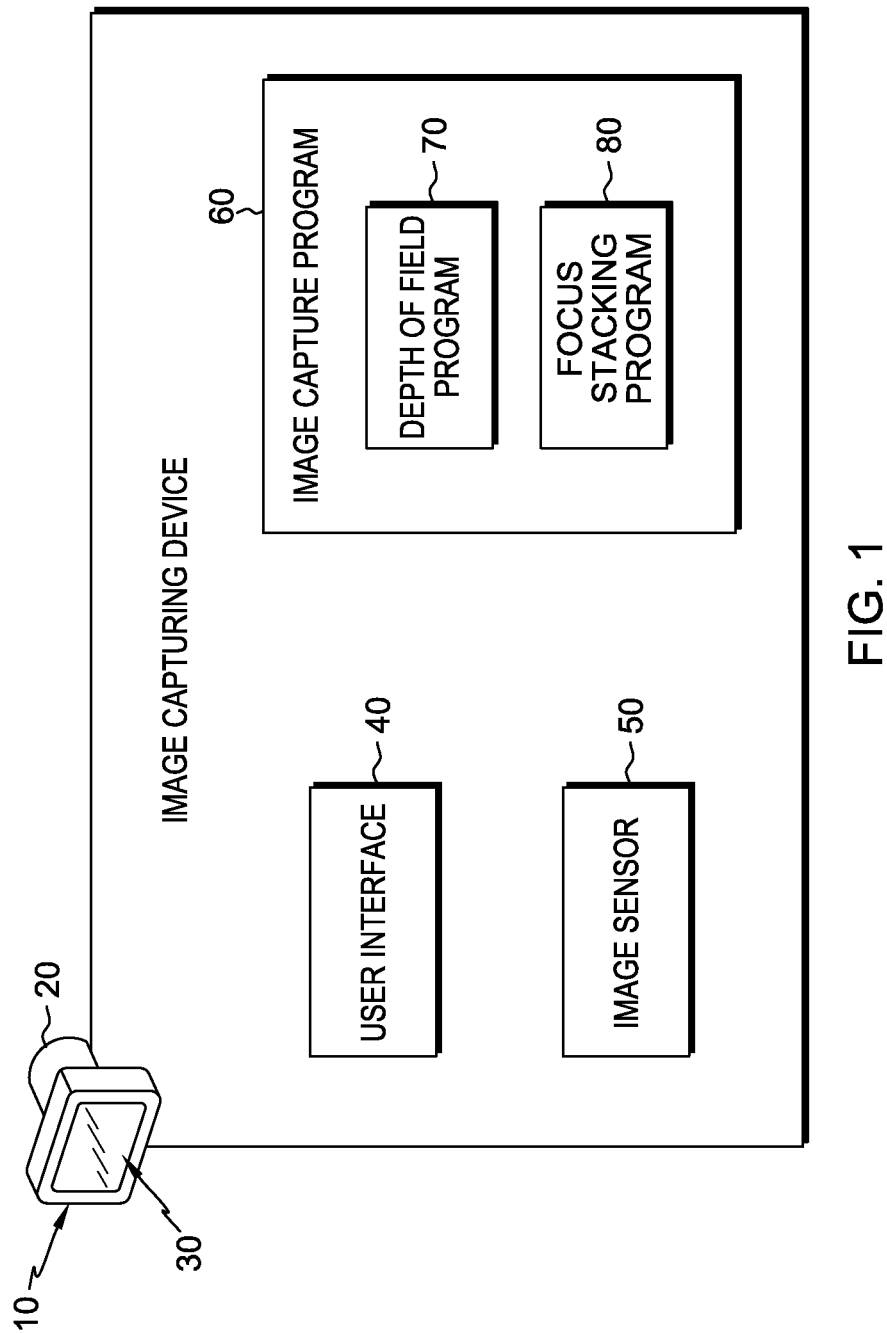
FIG. 1 is a functional block diagram of an image capturing device, in accordance with one embodiment of the present invention.

The present invention will now be described in detail with reference to the Figures. FIG. 1 is a functional block diagram of image capturing device 10, in accordance with one embodiment of the present invention. FIG. 1 provides only an illustration of one embodiment and does not imply any limitations with regard to the environments in which different embodiments may be implemented.

In the depicted embodiment, image capturing device 10 is a computing device integrated with an imaging device. For example, image capturing device 10 can be a digital camera, such as a digital single lens reflex camera (dSLR), having computer processing capabilities or, alternatively, an imaging device in communication with a separate distinct computing device. In other embodiments, image capturing device 10 may be a digital video camera, a computer with an integrated digital camera, a smart phone equipped with a digital camera, or any programmable electronic device capable of capturing and displaying digital images. Image capturing device 10 includes optical lens 20, display 30, user interface (UI) 40, image sensor 50, and image capture program 60, which includes depth of field program 70 and focus stacking program 80. Image capturing device 10 may include internal and external components as depicted in further detail with respect to FIG. 5.

Optical lens 20 is integrated with image capturing device 10. In one embodiment, optical lens 20 is an interchangeable dSLR lens. For example, optical lens 20 may be a 30 mm interchangeable dSLR lens. In another embodiment, optical lens 20 may be permanently fixed to image capturing device 10. For example, optical lens 20 is permanently fixed when image capturing device 10 is a digital point and shoot camera. Optical lens 20 operates to focus light onto image sensor 50.

An aperture (not shown) is the opening through which light travels through optical lens 20 and into image capturing device 10. The aperture may be located in different locations within optical lens 20. For example, the aperture may be a ring or other fixture that holds an optical element in place, or it may be a diaphragm placed in the optical path to limit the amount of light that passes through the lens. The aperture may be adjusted to control the amount of light entering image capturing device 10.

The lens focal length of optical lens 20 may be adjusted by the operator of image capturing device 10 if the optical lens is not a fixed focal length lens. The lens focal length is the distance over which the rays of light are focused on a focal point. The focal point is the point at which the rays of light converge and are focused. Adjusting the lens focal length of optical lens 20 will also adjust the f-number of optical lens 20, which is the ratio of the lens focal length to the diameter of the aperture. The f-number is set in order to adjust the aperture diameter in order to control the amount of light entering image capturing device 10. When written, the f-number is usually preceded by f/. Therefore, an f-number of 4 is written as f/4. For example, if optical lens 20 is a 100 mm focal length lens with an f-number setting of f/4, optical lens 20 will have an aperture diameter of 25 mm.

Display 30 is connected to image capturing device 10. In one embodiment, display 30 is a liquid crystal display (LCD) fixed to image capturing device 10. In another embodiment, display 30 is a display monitor connected to a computer with an integrated digital camera. In another embodiment, display 30 is a display monitor connected to image capturing device 10 via a network, or LAN. In yet another embodiment, display 30 is a monitor attached to image capturing device 10 via a cable. Display 30 operates to display a digital image captured by image capturing device 10. A digital image is comprised of a set of pixels. In one embodiment, a digital image may be a still image. In another embodiment, a digital image may be a digital video.

UI 40 operates on image capturing device 10 and works in conjunction with display 30 to visualize content, such as images captured by image capturing device 10. UI 40 may comprise one or more interfaces, such as an operating system interface and application interfaces. In one embodiment, UI 40 comprises an interface to image capture program 60, depth of field program 70, and focus stacking program 80. In one embodiment, UI 40 receives an image captured by image capturing program 60 and sends the image to display 30.

Image sensor 50 is integrated with image capturing device 10. Image sensor 50 is a detector that converts an optical image into an electronic signal. The electronic signals are quantized by an analog-to-digital (A/D) converter (not shown). In one embodiment, image sensor 50 may be a charge-coupled device (CCD) sensor. In another embodiment, image sensor 50 may be a complementary metal-oxide semiconductor (CMOS) sensor or another type of sensor. In yet another embodiment, image sensor 50 could be a specialized sensor for medical imaging.

In one embodiment, light passes through optical lens 20 and reaches image sensor 50, which contains an array of pixel sensors that are evenly distributed across image sensor 50. A pixel sensor may be comprised of a semiconductor material that absorbs light photons and generates electronic signals. In one embodiment, image sensor 50 may also contain autofocus pixel sensors. The autofocus pixel sensors may be an array of pixel sensors that are arranged in various patterns. In another embodiment, the autofocus pixel sensors may be contained on a sensor that is separate from image sensor 50.

Image capture program 60 includes capabilities of a standard image capture program. For example, image capture program 60 is a program operating on a digital camera, such as Nikon® Scene Recognition System. In one embodiment, image capture program 60 receives and processes electronic signals from image sensor 50.

In one embodiment, image capture program 60 also manages autofocus capabilities of image capturing device 10. Autofocus capabilities utilize one or more autofocus pixel sensors to determine if the image is in focus and electromechanically adjusts the focus of image capturing device 10 if the image is not in focus. The user may utilize UI 40 to operate image capture program 60 to select one or more focus points to set the photographer's focus point in the field of view of image capturing device 10. A focus point is a location in the field of view of image capture device 10 associated with an autofocus pixel sensor. Image capture program 60 then determines if the subject matter at a single focus point is in focus. If the subject matter at the single focus point is not in focus, then image capture program 60 electromechanically adjusts the focus until the subject matter is in focus.

If the autofocus capabilities of image capturing program 60 utilize active autofocus, image capturing program 60 may use ultrasonic waves or triangulation of infrared light to determine the distance between the subject and sensor 50. Active autofocus is a type of autofocus that determines correct focus by measuring distance to the subject independently of the optical system. In one embodiment, active autofocus utilizes an ultrasonic wave detector (not shown) to determine distance. In another embodiment, active autofocus utilizes an infrared light detector (not shown) to determine distance. In yet another embodiment, active autofocus utilizes another method to determine distance. If the autofocus capabilities of image capturing program 60 utilize passive autofocus, then image capture program 60 may use phase detection or contrast measurement to determine focus. Passive autofocus is a type of autofocus that determines correct focus by performing a passive analysis of the image that is entering the optical system. In one embodiment, image capture program 60 may be able to detect motion of the subject matter toward or away from the camera while maintaining focus on the subject matter.

In one embodiment, phase detection may also determine distance between the subject matter at a focus point and an autofocus pixel sensor associated with the focus point. Phase detection may function in a way similar to a rangefinder, which is a focusing mechanism that allows the user to measure the distance to the subject matter. A rangefinder shows two identical images. One image moves when a calibrated wheel on the image capturing device is turned. After the two images overlap and fuse into one, the distance is read off the calibrated wheel. For example, when utilizing phase detection, imaging device 10 contains a beam splitter (not shown)

that captures light from opposite sides of the lens and diverts light to autofocus sensors located separately from image sensor 50. This generates two separate images which are compared for light intensity and separation error in order to determine whether the image is in or out of focus. During this comparison, phase detection is used to determine the distance between the subject matter at a focus point to the associated autofocus pixel sensor. For example, digital cameras measure distance to the subject matter electronically.

Image capture program 60 sends the processed image to UI 40 for display on display 30. In one embodiment, image capture program 60 sends image data to depth of field program 70. In another embodiment, image capture program 60 sends image data to focus stacking program 80. In one embodiment, image data includes data required to calculate depth of field such as aperture diameter and focal length of optical lens 20. Image data also includes the distance between a subject at a focus point and an autofocus pixel sensor associated with the focus point by using the autofocus capabilities of image capture program 60. Image data also includes distances to a plurality of focus points.

Depth of field program 70 operates to visualize the depth of field of an image captured by image capture program 60. In one embodiment, depth of field program 70 receives image data from image capture program 60. Depth of field program 70 determines the depth of field of the captured image based on the received image data. Depth of field program 70 causes the depth of field to be displayed in UI 40 of image capturing device 10. In one embodiment, depth of field program 70 creates a depth map for the image. For example, depth of field program 70 creates a depth map that overlays a mask of varying transparency over an image to distinguish between areas that are inside the depth of field and areas that are outside the depth of field. In such an example, depth of field program 70 overlays an opaque mask over areas that are well outside the depth of field and a semi-transparent mask over focus points close to the depth of field. In another example, depth of field program 70 overlays a mask of varying colors or patterns over an image in order to distinguish between areas that are inside the depth of field and areas that are outside the depth of field. Depth of field program 70 may overlay a blue mask over areas that are well outside the depth of field and a red mask over focus points close to the depth of field. Depth of field program 70 may overlay areas inside the depth of field with a yellow mask. In this example, focus points that are inside the depth of field are not masked.

In one embodiment, depth of field program 70 sends depth maps to image capturing program 60. In another embodiment, depth of field program 70 sends depth maps to focus stacking program 80. As depicted, depth of field program 70 is a sub-program or routine of image capture program 60. In another embodiment, depth of field program 70 may be an independent program capable of communicating with image capture program 60 and focus stacking program 80.

Focus stacking program 80 operates to automatically focus subject matter of a captured image. In one embodiment, focus stacking program 80 receives image data, including a depth map, for the captured image from depth of field program 70. Focus stacking program 80 uses the depth map to determine areas of the captured image that are already in focus. In some embodiments, focus stacking program 80 also operates to determine a number of images required for focus stacking. In one embodiment, focus stacking program 80 determines a focus distance range for the capture of each image required for focus stacking. In another embodiment, focus stacking program 80 determines a physical distance from which each image is captured.

Focus stacking program 80 causes the determined number of images necessary for focus stacking to be captured. Focus stacking program 80 receives image data, including a depth map, for each captured image. Focus stacking program 80 determines depth data for each captured image from each respective depth map. Depth data includes the distance between each focus point of an image and image capturing device 10 at the time that the image was taken. Focus stacking program 80 compares the depth data for each captured image to the depth data for the set of captured images. Focus stacking program 80 determines focus points that are in focus in each captured image. Focus stacking program 80 selects focus points that are in focus in each captured image. Focus stacking program 80 creates a final image that includes selected in-focus focus points of each captured image.

Figure 2A:
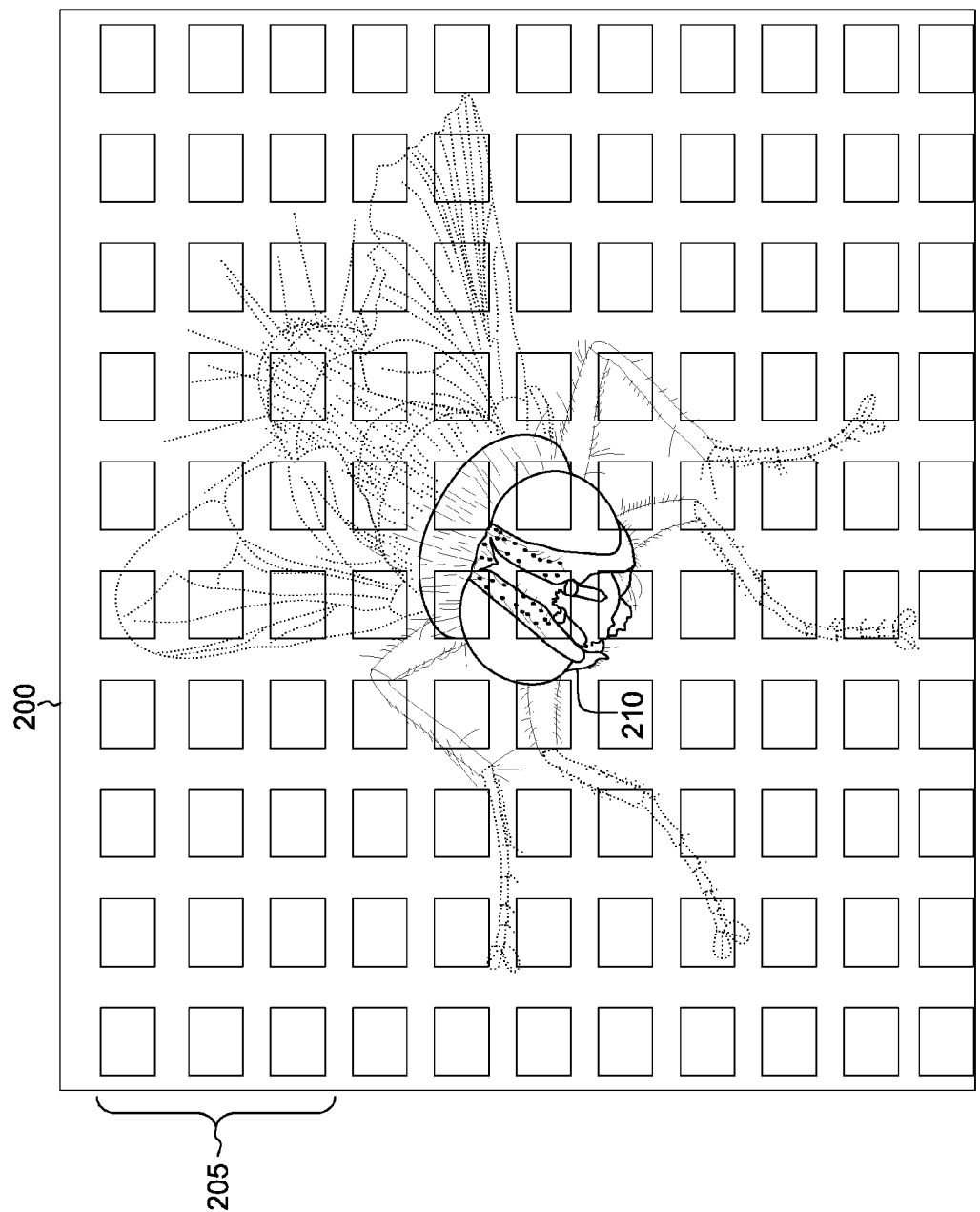
FIG. 2A is an exemplary view of a user interface for an image capturing program of a first image captured by the image capturing device of FIG. 1, in accordance with one embodiment of the present invention.
Figure 2B:
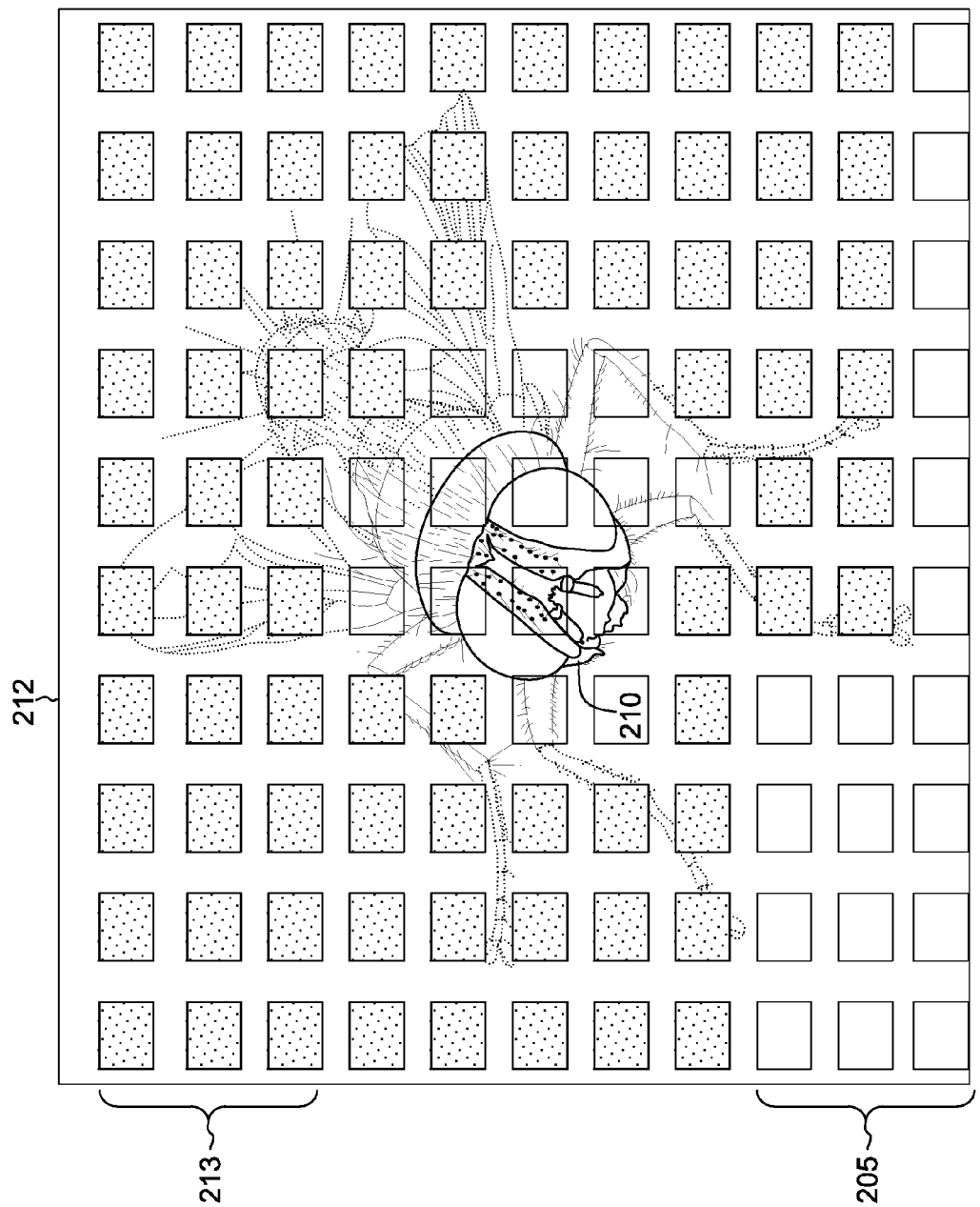
FIG. 2B is an exemplary view of the user interface for the first image as affected by a depth of field program for visualizing the depth of field, in accordance with one embodiment of the present invention.
Figure 2D:
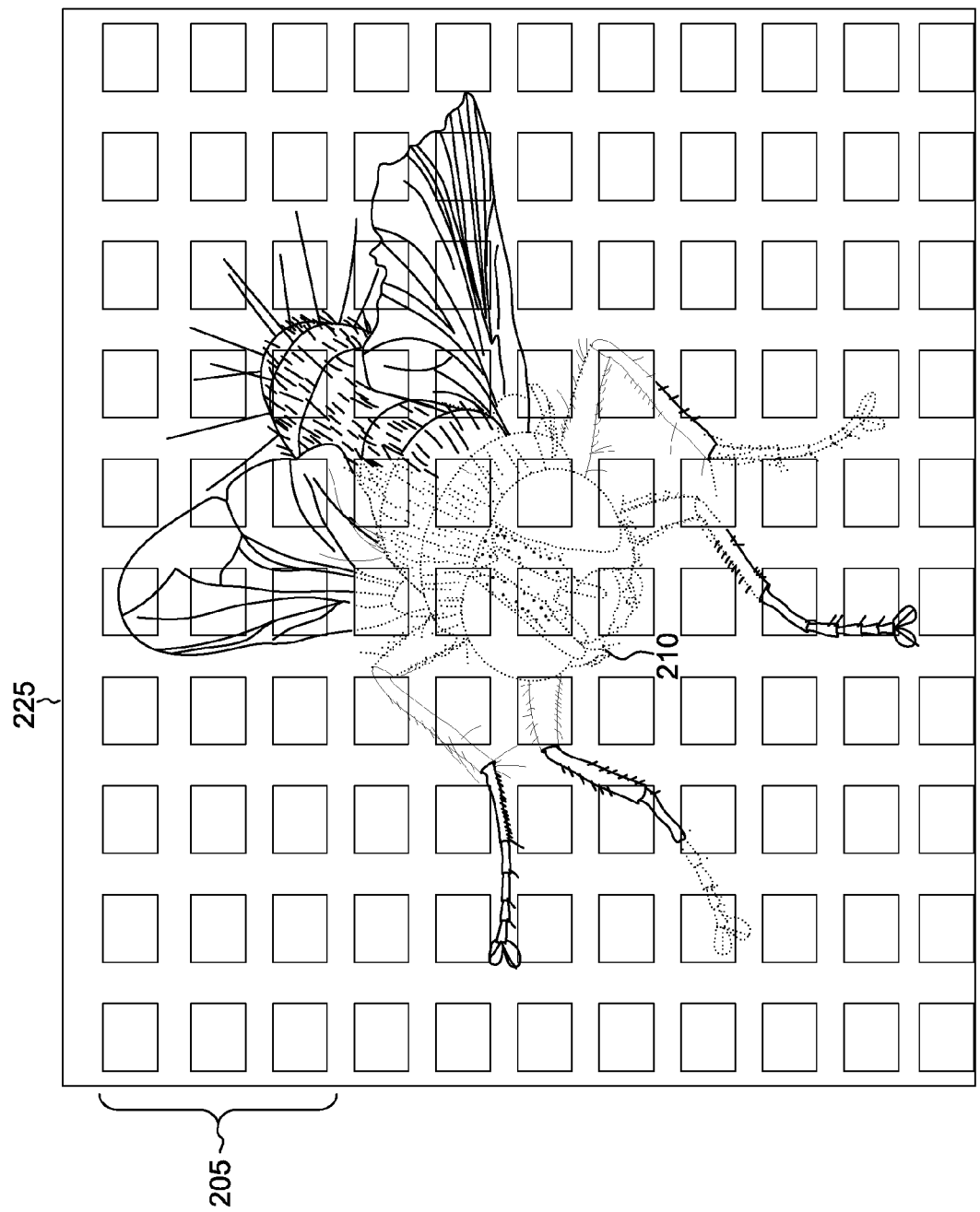
FIG. 2D is an exemplary view of a user interface for an image capturing program of a second image captured by the image capturing device of FIG. 1, in accordance with one embodiment of the present invention.
Figure 2E:
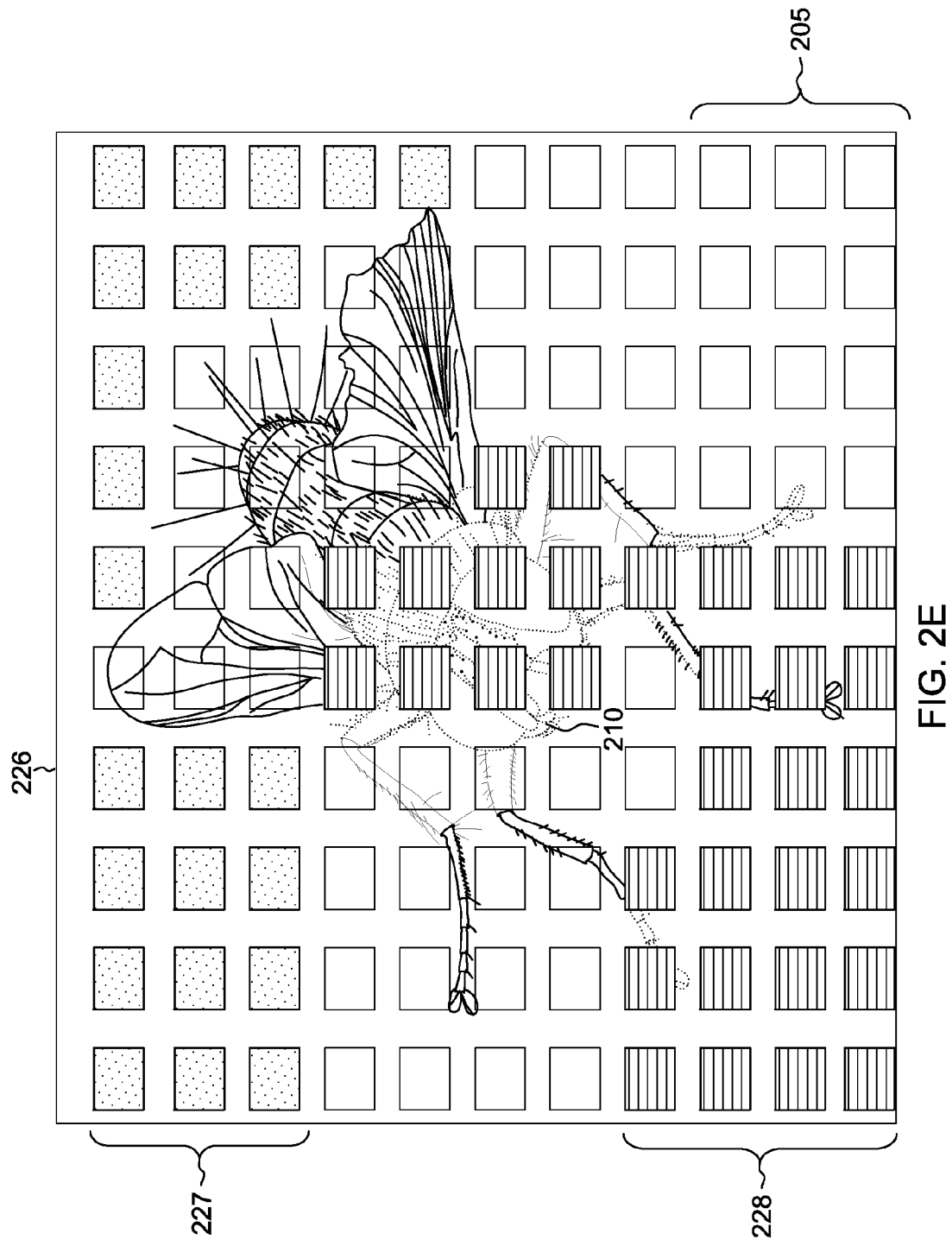
FIG. 2E is an exemplary view of the user interface for the second image as affected by a depth of field program for visualizing the depth of field, in accordance with one embodiment of the present invention.
Figure 2F:
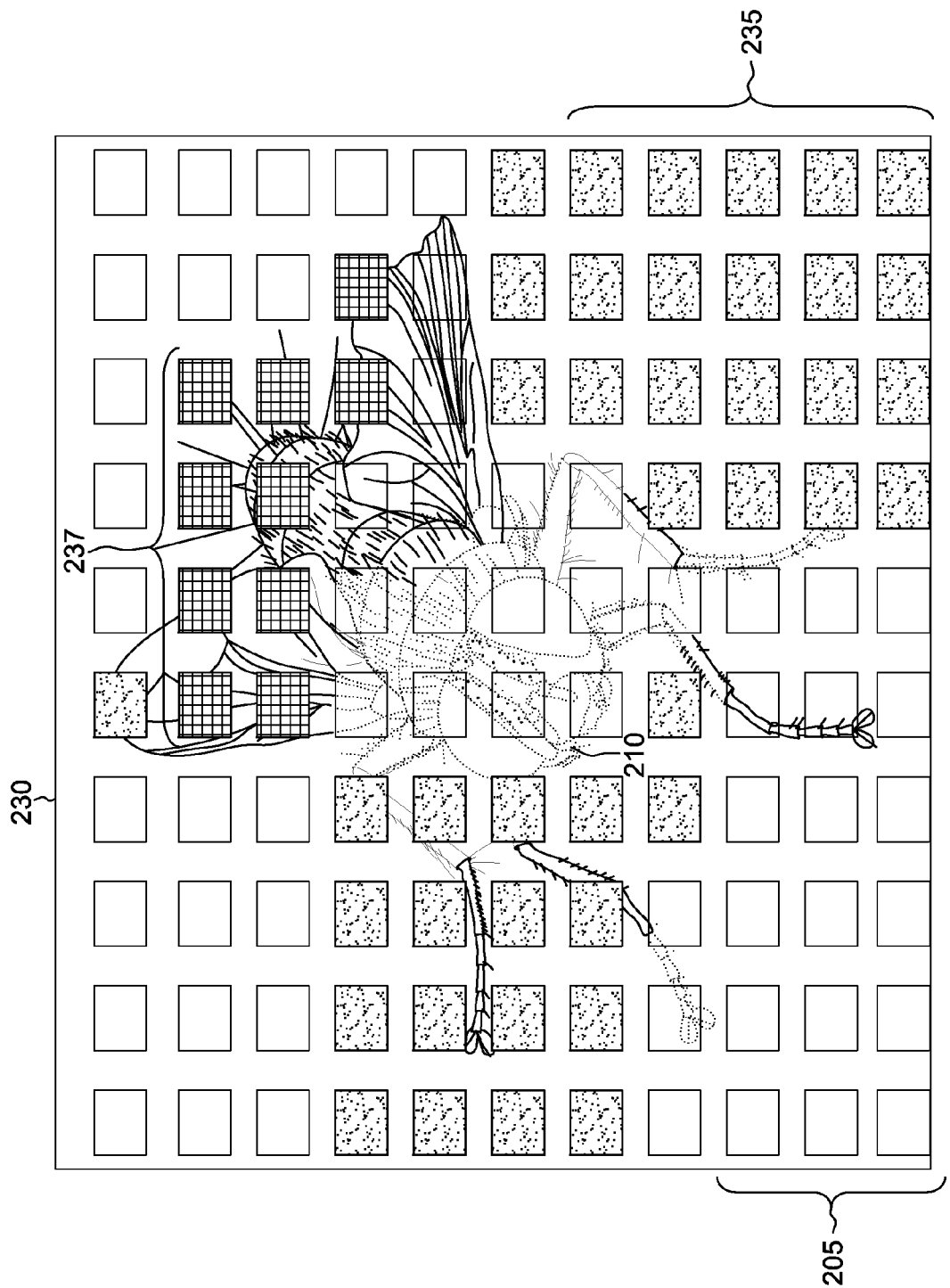
FIG. 2F is an exemplary view of the user interface for the second image as affected by a focus stacking program for automatically focusing subject matter of a captured image, in accordance with one embodiment of the present invention.
Figure 2G:
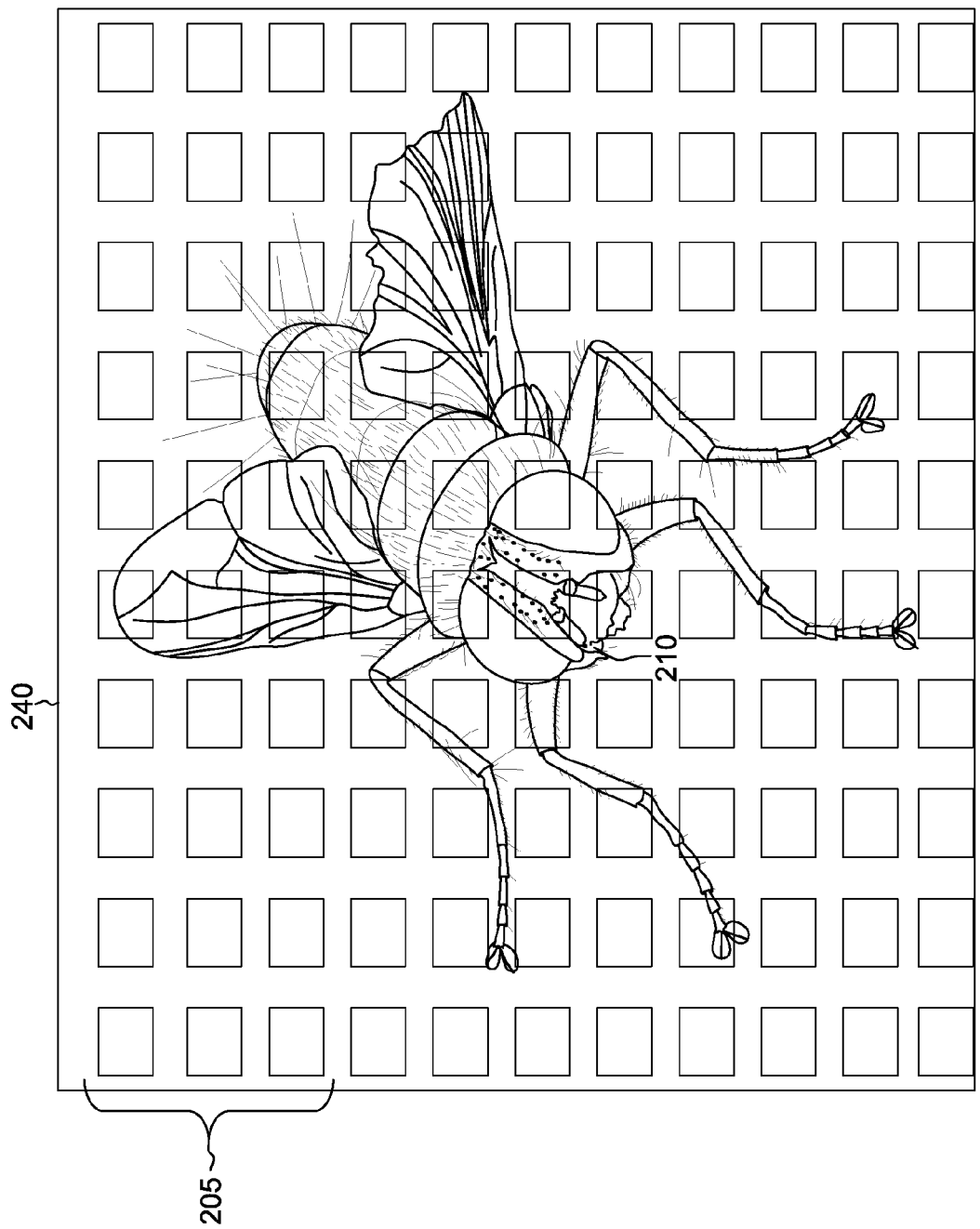
FIG. 2G is an exemplary view of the user interface for a final composite image created by a focus stacking program, in accordance with one embodiment of the present invention.

FIGS. 2A-G depict exemplary views of UI 40 via display 30 for image capture program 60, depth of field program 70, and focus stacking program 80, in accordance with one embodiment of the present invention. UI 200 of FIG. 2A, UI 212 of FIG. 2B, UI 215 of FIG. 2C, UI 225 of FIG. 2D, UI 226 of FIG. 2E, UI 230 of FIG. 2F, and UI 240 of FIG. 2G are each examples of UI 40 of FIG. 1 and, in the depicted embodiment, allow a user to see displayed content from image capture program 60, depth of field program 70, and focus stacking program 80. In one embodiment, each of UI 200-UI 240 represent automated steps of image capture program 60, depth of field program 70, and focus stacking program 80. In another embodiment, a user may interact with each of UI 200-UI 240.

In one embodiment, initially, a user operating image capturing device 10 positions image capturing device 10 such that image capturing device 10 is facing subject matter to be captured in an image. The user, using UI 40, captures an image of the object with image capturing device 10. Image capture program 60 receives image data associated with the captured image.

FIG. 2A depicts a display of UI 200 when image capture program 60 is operating on image capturing device 10. UI 200 displays a preview of a first image received from image capture program 60. Focus points 205 each represent locations in the field of view of image capturing device 10. Each focus point of focus points 205 is associated with an autofocus pixel sensor. The image includes subject 210. Areas of subject 210 that are in focus are indicated by a solid line. Areas of subject 210 that are out of focus are indicated by a dotted line.

FIG. 2B depicts a display of UI 212 when depth of field program 70 is operating on image capturing device 10. UI 212 displays the first image received from image capture program 60. The image shown in UI 212 is the same image shown in UI 200 of FIG. 2A. Depth of field program 70 determines that focus points 213 (as indicated by a first mask) are outside the focal plane and are therefore out of focus. Depth of field program 70 determines that focus points 213 each represent subject matter that is in the background of the captured image. Depth of field program 70 overlays focus points 213 with a first mask. In the depicted embodiment, the first mask is indicated by a spotted pattern. The steps of depth of field program 70 are described in more detail in the description of FIG. 3.

FIG. 2C depicts a display of UI 215 when focus stacking program 80 is operating on image capturing device 10. UI 215 displays the image received from image capture program 60. The image shown in UI 215 is the same image shown in UI 200 of FIG. 2A and UI 212 of FIG. 2B. Focus stacking program 80 determines that focus points 220 and focus points 222 (as indicated by a second mask) each represent subject matter in the focal plane and are therefore in focus. In the depicted embodiment, focus points 220 and focus points 222 are indicated by a second mask that is indicated by a wavy pattern. In one embodiment, the user, using UI 40, selects focus points to represent the foremost part of subject 210. In the depicted embodiment, the user selects focus points 224, which are indicated by a third mask that has a grid pattern. In another embodiment, focus stacking program 80 automatically determines the foremost part of subject 210. For example, focus stacking program 80 determines that focus points 224 represent the foremost part of subject 210 based on distance values determined from the received depth map.

In one embodiment, focus stacking program 80 uses the received depth map and focus points 224 to calculate the number of images required to create a final image in which subject 210 is in focus. In the depicted embodiment, focus stacking program 80 determines that in addition to the depicted image, a second image is required to be captured within a specified focus distance range.

FIG. 2D depicts a display of UI 225 when image capture program 60 is operating on image capturing device 10. UI 225 displays a preview of a second image received from image capture program 60. In the depicted embodiment, the second image is an image of the same subject, i.e., subject 210, as shown in FIGS. 2A-2C. The second image was captured at a different focus distance, as specified by focus stacking program 80, than the image shown in FIGS. 2A-C. Areas of subject 210 that are in focus are indicated by a solid line. Areas of subject 210 that are out of focus are indicated by a dotted line.

FIG. 2E depicts a display of UI 226 when depth of field program 70 is operating on image capturing device 10. UI 226 displays the second image received from image capture program 60. The image shown in UI 226 is the same as the image shown in UI 225 of FIG. 2D. Depth of field program 70 determines that focus points 227 and focus points 228 are outside the focal plane and are therefore out of focus. Depth of field program 70 determines that focus points 227 each represent subject matter that is in the background of the captured image. Depth of field program 70 masks focus points 227 with a first mask. In the depicted embodiment, the first mask is indicated by a spotted pattern. Depth of field program 70 determines that focus points 228 each represent subject matter that is in the foreground of the captured image. Depth of field program 70 masks focus points 228 with a second mask. In the depicted embodiment, the first mask is indicated by a striped pattern. The steps of depth of field program 70 are described in more detail in the description of FIG. 3.

FIG. 2F depicts a display of UI 230 when focus stacking program 80 is operating on image capturing device 10. The image shown in UI 230 is the same image shown in UI 225 of FIG. 2E and UI 226 of FIG. 2D. Focus stacking program 80 determines that focus points 235 (as indicated by a third mask) each represent subject matter in the focal plane and are therefore in focus. In the depicted embodiment, focus points 220 and focus points 222 are indicated by a third mask that is indicated by a wavy pattern. In one embodiment, the user, using UI 40, selects focus points to represent the rearmost part of subject 210. In the depicted embodiment, the user selects focus points 237, which are indicated by a fourth mask that has a grid pattern. In another embodiment, focus stacking program 80 automatically determines the rearmost part of subject 210. For example, focus stacking program 80 determines that focus points 237 represent the rearmost part of subject 210 based on distance values determined from the received depth map.

FIG. 2G depicts a display of UI 240 when focus stacking program 80 is operating on image capturing device 10. UI 240 depicts a final image. The final image is a combination of the first image displayed in UI 200 of FIG. 2A and the second image displayed in UI 230 of FIG. 2D. The final image includes subject 210. The final image includes focus points 220 and focus points 222 of FIG. 2C and focus points 235 of FIG. 2F. The subject matter of the final image is in focus. In one embodiment, if the user has not selected focus points that are in focus for every section of the final image, focus stacking program 80 selects focus points from the set of captured images that are as close to being in the depth of field as possible.

Figure 3:
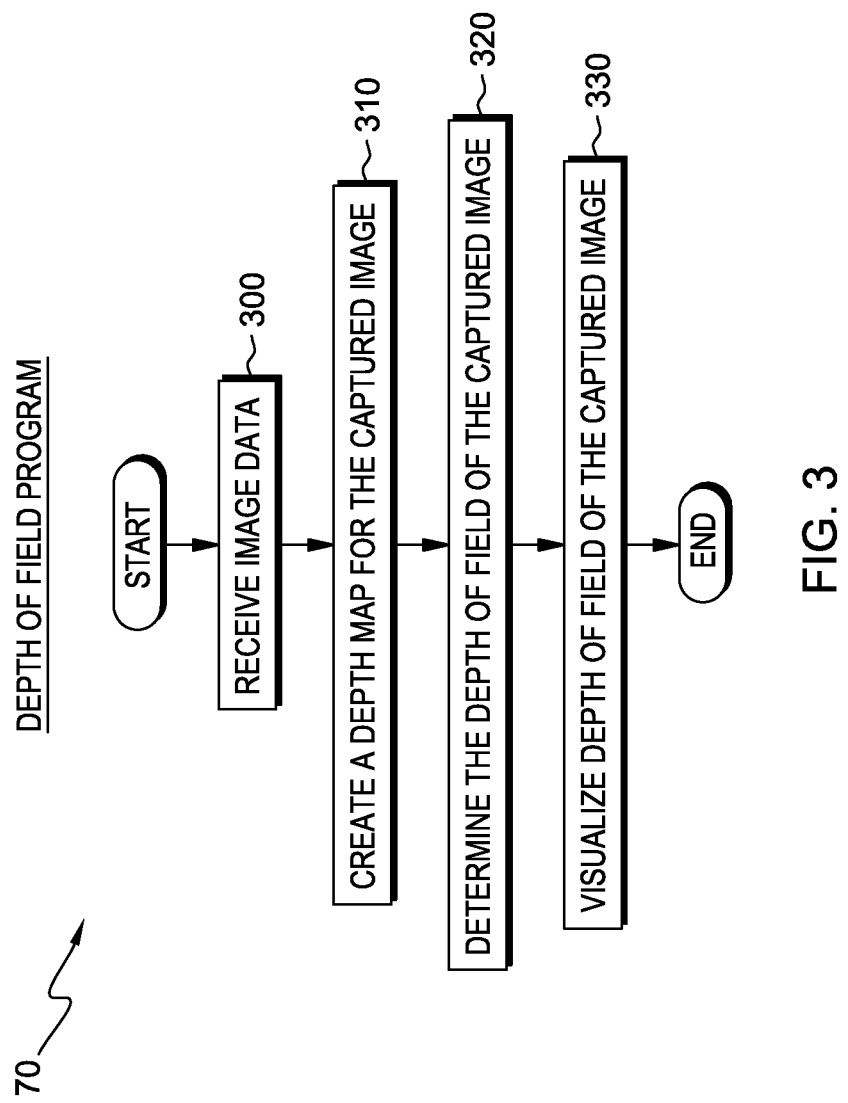
FIG. 3 is a flowchart depicting the steps of the depth of field program, for to visualize the depth of field of a captured image, in accordance with one embodiment of the present invention.

FIG. 3 is a flowchart depicting operational steps of depth of field program 70 for visualizing the depth of field of a captured image, in accordance with an embodiment of the present invention.

In one embodiment, the user selects the photographer's focus point in the field of view. In one embodiment, initially, light passes through lens 20. Image sensor 50 absorbs light, converts it into an electronic signal, and sends the signal to image capture program 60. Image capture program 60 receives the electronic signal from image sensor 50. Image capture program 60 adjusts autofocus to bring the subject matter at the photographer's focus point into focus. Image capture program 60 determines a distance between subject matter at a focus point and an autofocus pixel sensor associated with the focus point for each focus point in a plurality of focus points. In one embodiment, image capture program 60 determines image data, which includes data required to calculate depth of field, such as aperture diameter, focal length of optical lens 20, and the distance between the subject matter at the photographer's focus point and the autofocus pixel sensor associated with the photographer's focus point by using the image capture program's autofocus capabilities. Image data also includes the distance between subject matter at a focus point and an autofocus pixel sensor associated with the focus point for each focus point in a plurality of focus points. In one embodiment, image capture program 60 sends some or all of the image data to depth of field program 70.

In one embodiment, image capture program 60 causes the captured image to be displayed in user interface 40. In another embodiment, image capture program 60 sends the captured image to depth of field program 70.

In step 300, depth of field program 70 receives image data. In one embodiment, depth of field program 70 receives image data from image capture program 60. In another embodiment, depth of field program 70 may access the autofocus capabilities of image capture program 60 and the depth of field program determines image data. Image data includes data required to calculate depth of field, such as aperture diameter, focal length of optical lens 20, and the distance between the subject matter at the photographer's focus point and the autofocus pixel sensor associated with the photographer's focus point.

In step 310, depth of field program 70 creates a depth map for the captured image. In one embodiment, a depth map represents pixels of the captured image and the distances associated with each pixel to the autofocus pixel sensor associated with each pixel. Each focus point of the plurality of focus points is associated with one or more pixels of the captured image. Each distance in the image data is associated with a focus point. In one embodiment, depth of field program 70 determines the average of the distances for the pixels of the captured image that are not associated with a focus point. For example, depth of field program 70 determines the average of the distances associated with two adjacent focus points, and assigns the average distance value to the pixels between the two adjacent focus points that are not associated with a focus point. In another embodiment, depth of field program 70 determines graduated distances for pixels that are not associated with a focus point. For example, depth of field program 70 determines the distances for two adjacent focus points and assigns distance values to the pixels between the two adjacent focus points that are not associated with a focus point.

In step 320, depth of field program 70 determines the depth of field for the image captured by image capture program 60. In one embodiment, depth of field program 70 determines the depth of field for a captured image based on the image data. Image data includes aperture diameter, focal length of optical lens 20, and the distance between the subject matter at the photographer's focus point to the autofocus pixel sensor associated with the photographer's focus point. For example, depth of field program 70 determines the depth of field for the captured image by using a known algorithm to calculate depth of field. Depth of field includes a range of distances from the focus point selected by the photographer.

In step 330, depth of field program 70 visualizes the depth of field of the captured image. In one embodiment, depth of field program 70 determines which pixels of the captured image are in the depth of field. Depth of field program 70 compares the range of distances in the depth of field to the distance values assigned to each pixel in the depth map (created in step 310). If a pixel falls into the range of distances in the depth of field, then the pixel is considered to be in the depth of field. If a pixel is associated with a distance further than the depth of field, then the pixel is considered to be beyond the depth of field in the background of the captured image. Depth of field program 70 masks pixels that are beyond the depth of field with an overlay, as shown in FIG. 2B and FIG. 2E. Depth of field program 70 does not mask pixels that are in the depth of field. If a pixel is associated with a distance closer than the depth of field, then depth of field program 70 considers the pixel to be outside the depth of field and in the foreground of the captured image. Depth of field program 70 masks pixels that are closer than the depth of field with an overlay, as shown in FIG. 2B and FIG. 2E.

In one embodiment, compositional elements of the captured image that are "in focus" or within the depth of field are not masked. Elements outside the plane of focus are masked by a progressively opaque mask, with the points furthest from the plane of focus of the lens being the least transparent. In another embodiment, the elements furthest from the plane of focus of the lens are blurred, as this depth map simulates how the final image will appear on a larger display. In yet another embodiment, elements in the background are masked by a pattern or color and elements in the foreground are masked by a different pattern or color.

In one embodiment, depth of field program 70 causes the depth of field of the captured image to be displayed on user interface 40 via display 30. The mask visualized across the image shown on display 30 of image capturing device 10 helps the user visualize the locations of objects in the image with respect to the subject of the digital image and previews the digital image so the user can clearly see which elements are in focus and which elements are out of focus. Some or all parts of the digital image may be masked. In one embodiment, depth of field program 70 sends an indication of which pixels to overlay and the type of mask to use to user interface 40. In another embodiment, depth of field program 70 sends an indication of which pixels to overlay and the type of mask to image capture program 60, and image capture program 60 sends the indication to user interface 40.

Figure 4:
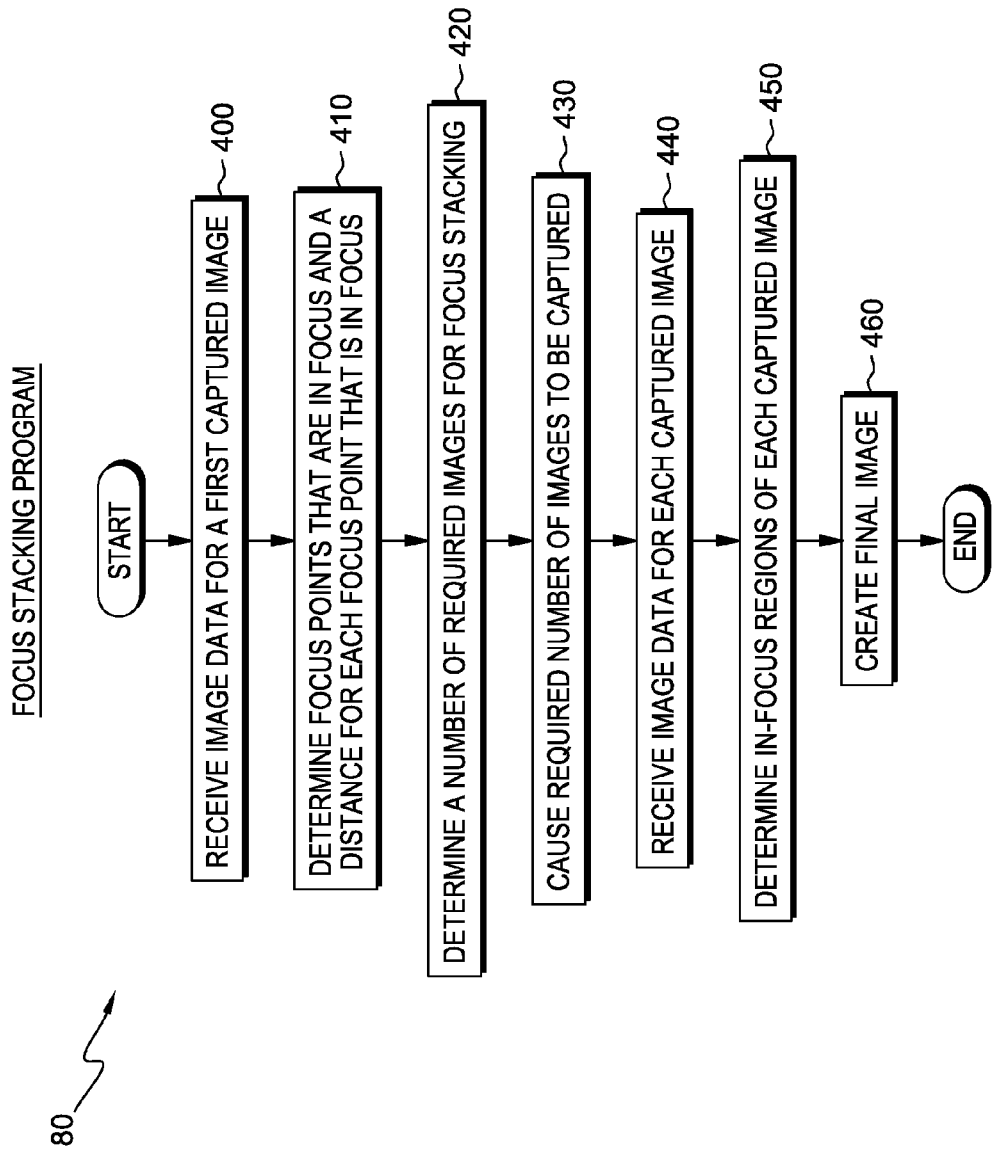
FIG. 4 is a flowchart depicting the steps of the focus stacking program, for automatically focusing subject matter of a captured image, in accordance with one embodiment of the present invention.

FIG. 4 is a flowchart depicting operational steps of focus stacking program 80 for automatically focusing subject matter of an image captured by image capturing device 10, in accordance with one embodiment of the present invention.

In one embodiment, initially, a user operating image capturing device 10 positions image capturing device 10 such that image capturing device 10 is facing subject matter to be captured in an image. The user, using image capturing device 10, captures an image of the object. In capturing the image, light passes through optical lens 20. Image sensor 50 then absorbs the light, converts it into an electronic signal, and sends the electronic signal to image capture program 60. Image capture program 60 receives the electronic signal from image sensor 50. Image capture program 60 adjusts autofocus to bring the subject matter into focus. Image capture program 60 determines a distance between subject matter at a focus point automatically selected by image capture program 60 and an autofocus pixel sensor associated with the focus point.

Image capture program 60 receives image data. In one embodiment, image capture program 60 sends image data to depth of field program 70. Depth of field program 70 receives image data from image capture program 60. Depth of field program 70 creates a depth map for the captured image. In one embodiment, depth of field program 70 sends image data, including, the depth map, to focus stacking program 80. In another embodiment, depth of field program 70 sends the depth map to image capture program 60 and image capture program 60 sends the image data, including the depth map, to focus stacking program 80.

Image capture program 60 causes a preview of the image to be displayed on UI 40. In one embodiment, image capture program 60 prompts the user to indicate subject matter of the image. The subject matter of the image includes focus points of the captured image that must be in focus in a final image. For example, image capture program 60 causes a modeless window to be displayed which prompts the user to indicate the subject matter of the image. A modeless window is a window that does not require a user interaction before the user can return to operating a parent application (e.g. image capture program 60). The user can, for example, continue to interact with image capture program 60, depth of field program 70, focus stacking program 80, or any other program or application on image capturing device 10 while the modeless window is open. The user, using UI 40, selects the subject matter. Image capture program 60 sends the subject matter to focus stacking program 80.

In step 400, focus stacking program 80 receives image data for a first image captured by image capturing device 10. In one embodiment, focus stacking program 80 receives image data from image capture program 60. In another embodiment, focus stacking program 80 receives image data from depth of field program 70. In yet another embodiment, focus stacking program 80 accesses a storage repository and determines image data. Image data includes a depth map, generated by depth of field program 70, for the captured image. In one embodiment, image data also includes subject matter selected by the user.

In step 410, focus stacking program 80 determines focus points that are in focus and a distance value for each focus point that is in focus. A distance value represents the distance between sensor 50 and the subject matter represented by each focus point. In one embodiment, focus stacking program 80 uses the depth map received from depth of field program 70 to determine focus points that are in focus. For example, focus stacking program 80 determines that focus points not masked by the depth map are in focus, as is shown in FIG. 2C. In another embodiment, focus stacking program 80 uses the depth map to determine a distance value for each focus point that is in focus. In yet another embodiment, focus stacking program 80 receives depth data from image capture program 60.

In step 420, focus stacking program 80 determines a number of required images for focus stacking. In one embodiment, focus stacking program 80 uses image data to determine the number of required images for focus stacking. For example, focus stacking program 80 may determine the minimum number of required images for focus stacking from the f-number that was used to capture the first image. In such an example, if the f-number is large, indicating that the aperture diameter is small, then focus stacking program 80 determines that fewer images are required than if the f-number is small. If the focal length is long, indicating that the depth of field may be shallow, then focus stacking program 80 determines that a greater number of images is required. Additionally, if the aperture diameter is large, indicating the depth of field may be shallow, then focus stacking program 80 determines that a greater number of images is required. In other embodiments, focus stacking program 80 determines a number of required images for focus stacking from the focal length that was used to capture the first image. For example, if the focal length is large, indicating that the aperture diameter is large, then focus stacking program 80 determines that a greater number of images is required.

In one embodiment, focus stacking program 80 may determine an aperture value for the additional image(s) to be captured. For example, focus stacking program 80 determines an aperture values for each of the additional images utilizing the f-number that was used to capture the first image. In one embodiment, focus stacking program 80 causes the determined number of images to be displayed. For example, focus stacking program 80 sends an instruction to image capture program 60 to display the determined number of images on display 30. The user, utilizing UI 40, accepts or rejects the calculated number of images. In another embodiment, focus stacking program 80 also displays determined data to be used for capture of the additional image(s). For example, data to be used for capture of the additional image(s) is the determined focus distance range. In another example, data to be used for capture of the additional image(s) is the determined aperture value.

In another embodiment, focus stacking program 80 prompts the user to indicate a desired number of images to be used for focus stacking. In some embodiments, focus stacking program 80 causes a modeless window to be displayed. The user, using UI 40, specifies a desired number of images to be used for focus stacking. For example, the user specifies that four additional images at specific aperture values should be captured by image capturing device 10 for focus stacking.

In one embodiment, focus stacking program 80 causes a preview of each additional image to be displayed on display 30. For example, focus stacking program 80 overlays focus points associated with subject matter in the first captured image with a mask. The mask simulates how the selected subject matter will appear when captured at a different aperture. The user, utilizing UI 40, approves of, or rejects each preview. If the user rejects a preview, then focus stacking program 80 will not use the aperture value associated with that particular preview when capturing an additional image. The user, utilizing UI 40, may indicate a different aperture value to be used for an additional image.

In step 430, focus stacking program 80 causes the required number of images to be captured. In one embodiment, focus stacking program 80 sends an instruction to image capture program 60 to capture the required number of images. In one embodiment, the instruction includes a specific aperture setting to be used in capturing each required image. In another embodiment, if the user is using focus rails, focus stacking program 80 displays an instruction that describes how to adjust the focus rails. Focusing rails may be used to move the physical position of the camera, typically rearward and forward, in order to precisely adjust the plane of focus without changing the focus on the camera. For example, an instruction may describe a starting position and an ending position for image capturing device 10 on the focus rails during image capture. In another example, an instruction may also describe the direction in which image capturing device should be moved during image capture (i.e. moving forward or rearward).

In step 440, focus stacking program 80 receives image data for each additionally captured image. In one embodiment, focus stacking program 80 receives image data from image capture program 60. In another embodiment, focus stacking program 80 receives image data from depth of field program 70. In yet another embodiment, focus stacking program 80 accesses a storage repository and determines image data. Image data includes a depth map for the captured image. In one embodiment, image data also includes a selection of subject matter by the user.

In step 450, focus stacking program 80 determines in-focus regions of each captured image. In one embodiment, focus stacking program 80 uses the received depth map for each captured image to determine in-focus regions of each captured image, as shown in FIG. 2F. For example, focus stacking program 80 determines that focus points that are not masked by the depth map are in focus. In another embodiment, focus stacking program 80 uses image data received from image capture program 60 to determine in-focus regions of each captured image. For example, focus stacking program 80 determines that focus points that have distance values that are within the focal plane are in focus.

In step 460, focus stacking program 80 creates a final image. Focus stacking program 80 includes focus points that are in focus from each captured image in the final image, such as depicted in FIG. 2G. In one embodiment, focus stacking program 80 includes focus points that have depth data indicating that the focus points are inside the depth of field in the final image. For areas of the image that are out of focus, focus stacking program 80 selects focus points that have depth data indicating that the focus points are as close to the depth of field as possible.

In one embodiment, focus stacking program 80 causes the final image to be displayed on display 30. In one embodiment, the user, utilizing UI 40, interacts with the final image. For example, the user rejects a region of the final image automatically selected by focus stacking program 80. The user can customize the final image to substitute the same region from a different captured image selected by the user. In one embodiment, focus stacking program 80 receives an indication to capture more images for focus stacking.

Figure 5:
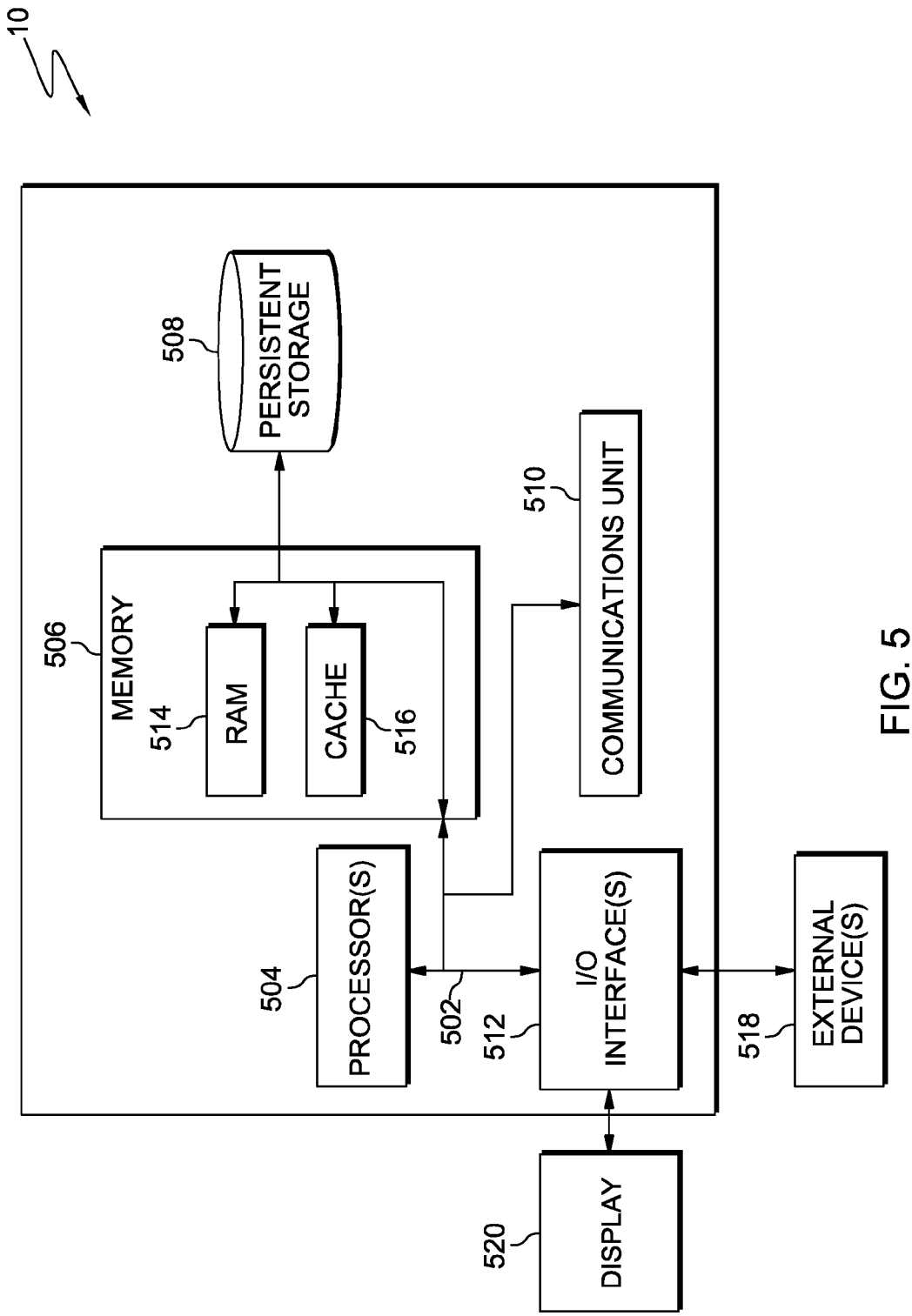
FIG. 5 depicts a block diagram of components of the image capturing device of FIG. 1, in accordance with one embodiment of the present invention.

FIG. 5 depicts a block diagram of components of image capturing device 10 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Image capturing device 10 includes communications fabric 502, which provides communications between computer processor(s) 504, memory 506, persistent storage 508, communications unit 510, and input/output (I/O) interface(s) 512.

Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

UI 40, image capture program 60, depth of field program 70, and focus stacking program 80 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other servers. In these examples, communications unit 510 includes one or more network interface cards. Communications unit 510 may provide communications through the use of either or both physical and wireless communications links. UI 40, image capture program 60, depth of field program 70, and focus stacking program 80 may be downloaded to persistent storage 508 through communications unit 510.

I/O interface(s) 512 allows for input and output of data with other devices that may be connected to image capturing device 10. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., UI 40, image capture program 60, depth of field program 70, and focus stacking program 80, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for generating a focused image of subject matter, the method comprising:
    receiving a first image, wherein the first image includes subject matter and a first set of image data;
    generating, by one or more processors, a first depth map for the first image using at least the first set of image data, wherein the first depth map indicates at least a first portion of the subject matter that is in focus;
    determining, by one or more processors, at least a second image to be captured and one or more settings associated with the second image, based at least on the first set of image data;
    causing, by one or more processors, the second image to be captured, according to the one or more settings associated with the second image;
    receiving the second image, wherein the second image includes the subject matter of the first image and at least a second portion of the subject matter that is in focus;
    generating, by one or more processors, a composite image comprising at least the first portion of the first image and the second portion of the second image.

2. The method of claim 1, wherein the second image further includes a second set of image data.

3. The method of claim 2, wherein the step of receiving the second image further comprises:
    generating, by one or more processors, a second depth map using at least the second set of image data, wherein the second depth map indicates at least the second portion of the subject matter that is in focus in the second image.

4. The method of claim 1, wherein the step of generating a composite image comprising at least the first portion of the first image and the second portion of the second image comprises:
    including, by one or more processors, the second portion of the second image within the first image, such that the second portion replaces the corresponding portion of the subject matter of the first image.

5. The method of claim 1, wherein the step of generating a composite image comprising at least the first portion of the first image and the second portion of the second image comprises:
    receiving a selection of a third portion from the first depth map, wherein the third portion does not include the subject matter; and
    generating, by one or more processors the composite image comprising at least the first portion of the first image, the second portion of the second image, and the third portion of the first image.

6. The method of claim 1, wherein the one or more settings associated with the second image includes an aperture value.

7. The method of claim 1, wherein image data includes an f-number used during capture of the respective image.

8. A computer program product for generating a focused image of subject matter, the computer program product comprising:
    one or more computer readable storage media and program instructions stored on the one or more computer readable storage media, the program instructions comprising:
    program instructions to receive a first image, wherein the first image includes subject matter and a first set of image data;
    program instructions to generate a first depth map for the first image using at least the first set of image data, wherein the first depth map indicates at least a first portion of the subject matter that is in focus;
    program instructions to determine at least a second image to be captured and one or more settings associated with the second image, based at least on the first set of image data;
    program instructions to cause the second image to be captured, according to the one or more settings associated with the second image;

program instructions to receive the second image, wherein the second image includes the subject matter of the first image and at least a second portion of the subject matter that is in focus;

program instructions to generate a composite image comprising at least the first portion of the first image and the second portion of the second image.

9. The computer program product of claim 8, wherein the second image further includes a second set of image data.

10. The computer program product of claim 9, wherein program instructions to receive the second image further comprise:

program instructions to generate a second depth map using at least the second set of image data, wherein the second depth map indicates at least the second portion of the subject matter that is in focus in the second image.

11. The computer program product of claim 8, wherein program instructions to generate a composite image comprising at least the first portion of the first image and the second portion of the second image comprise:

program instructions to include the second portion of the second image within the first image, such that the second portion replaces the corresponding portion of the subject matter of the first image.

12. The computer program product of claim 8, wherein program instructions to generate a composite image comprising at least the first portion of the first image and the second portion of the second image comprise:

program instructions to receive a selection of a third portion from the first depth map, wherein the third portion does not include the subject matter; and program instructions to generate the composite image comprising at least the first portion of the first image, the second portion of the second image, and the third portion of the first image.

13. The computer program product of claim 8, wherein the one or more settings associated with the second image includes an aperture value.

14. The computer program product of claim 8, wherein image data includes an f-number used during capture of the respective image.

15. A computer system for generating a focused image of subject matter, the computer system comprising:

one or more computer processors;

one or more computer readable storage media;

program instructions stored on the computer readable storage media for execution by at least one of the one or more processors, the program instructions comprising:

program instructions to generate a first depth map for the first image using at least the first set of image data, wherein the first depth map indicates at least a first portion of the subject matter that is in focus;

program instructions to determine at least a second image to be captured and one or more settings associated with the second image, based at least on the first set of image data;

program instructions to cause the second image to be captured, according to the one or more settings associated with the second image;

program instructions to receive the second image, wherein the second image includes the subject matter of the first image and at least a second portion of the subject matter that is in focus;

program instructions to generate a composite image comprising at least the first portion of the first image and the second portion of the second image.

16. The computer system of claim 15, wherein the second image further includes a second set of image data.

17. The computer system of claim 16, wherein program instructions to receive the second image further comprise:

program instructions to generate a second depth map using at least the second set of image data, wherein the second depth map indicates at least the second portion of the subject matter that is in focus in the second image.

18. The computer system of claim 15, wherein program instructions to generate a composite image comprising at least the first portion of the first image and the second portion of the second image comprise:

program instructions to include the second portion of the second image within the first image, such that the second portion replaces the corresponding portion of the subject matter of the first image.

19. The computer system of claim 15, wherein program instructions to generate a composite image comprising at least the first portion of the first image and the second portion of the second image comprise:

program instructions to receive a selection of a third portion from the first depth map, wherein the third portion does not include the subject matter; and program instructions to generate the composite image comprising at least the first portion of the first image, the second portion of the second image, and the third portion of the first image.

20. The computer system of claim 15, wherein the one or more settings associated with the second image includes an aperture value.

\* \* \* \* \*